United States Patent [19]
Heidorn et al.

[11] Patent Number: 5,483,409
[45] Date of Patent: Jan. 9, 1996

[54] 25-PAIR CIRCUIT PROTECTION ASSEMBLY

[75] Inventors: Richard H. Heidorn, Lombard; George Z. Lannert, Evanston, both of Ill.

[73] Assignee: Illinois Tool Works Inc., Glenview, Ill.

[21] Appl. No.: 44,156

[22] Filed: Apr. 8, 1993

[51] Int. Cl.⁶ .............................. H02H 3/22; H02H 1/04
[52] U.S. Cl. ........................ 361/119; 361/111; 361/823
[58] Field of Search ................................ 361/103, 104, 361/106, 107, 111, 112, 117, 119, 124, 126, 127, 728, 823, 824; 174/51; 439/95, 108, 620, 719, 49, 540, 572, 709

[56] References Cited

U.S. PATENT DOCUMENTS

| | | | |
|---|---|---|---|
| Re. 31,714 | 10/1984 | Knickerbocker | 361/823 |
| 4,131,330 | 12/1978 | Stupay | 439/540 |
| 4,595,799 | 6/1986 | Krob et al. | 361/823 |
| 4,827,502 | 5/1989 | Suffi et al. | 361/119 |
| 4,846,735 | 7/1989 | Teichler et al. | 439/719 |
| 4,875,232 | 10/1989 | Shumway | 361/104 |
| 4,907,120 | 3/1990 | Kaczmarek et al. | 361/119 |
| 4,922,374 | 5/1990 | Mueller et al. | 361/119 |
| 4,924,345 | 5/1990 | Siemon et al. | 361/111 |

Primary Examiner—Jeffrey A. Gaffin
Assistant Examiner—Ronald W. Leja
Attorney, Agent, or Firm—Schwartz & Weinrieb

[57] ABSTRACT

A circuit protection assembly for protecting telephone communication related equipment includes a two-piece interfitting housing, a printed circuit board sub-assembly, an exposed side connector device, and a protected side connector device. The printed circuit board is mounted internally inside the housing and is adapted to receive any number of circuit protector combinations of overvoltage, overcurrent and line-status devices. Each of the exposed side and protected side connector devices can be one of several different types of connector so as to provide versatile mechanical connections to the circuit protectors.

23 Claims, 6 Drawing Sheets

25-PAIR CIRCUIT PROTECTION ASSEMBLY

FIELD OF THE INVENTION

This invention relates generally to overvoltage and/or overcurrent protection packages, and more particularly, it relates to a 25-pair circuit protection assembly having a two-piece interfitting housing which receives a printed circuit board for mounting overvoltage, overcurrent and/or line status devices, an exposed side connector device, and a protected side connector device for protecting telephone communication related equipment and the like.

BACKGROUND OF THE INVENTION

Figure 1:
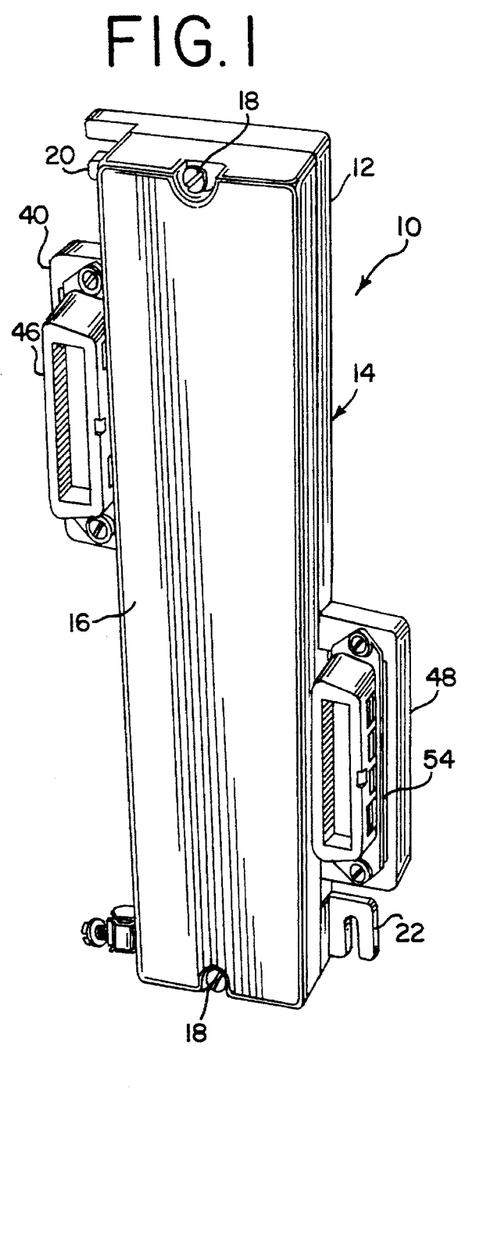
FIG. 1 is a perspective view of a first embodiment of a 25-pair circuit protection assembly, constructed in accordance with the principles of the present invention.
Figure 1A:
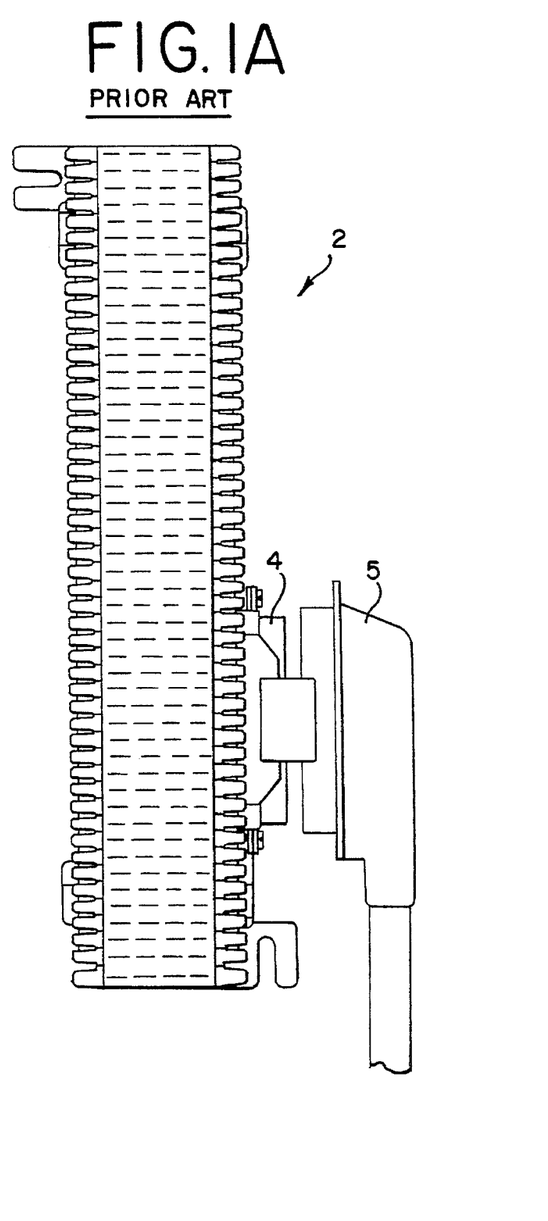
FIG. 1A is a front plan view of a conventional 66-M terminal block of the prior art.

As is generally known in the art of telephone communication, there has been extensively used a certain connection block referred to sometimes as a "66-M type terminal connector block" that provides rapid wiring installation of key telephone systems, PBX systems, cables, and other terminal equipment. Typically, these 66-M type terminal blocks are mounted on a standoff bracket and serve as an interface with user provided equipment. Further, the users are generally required to mount a connector(s) on the side(s) or bottom of the bracket so as to interface with the 66-M type terminal block. In FIG. 1A, there is illustrated a conventional 66-M terminal block 2 of the prior art with a connector 4 connected to one side thereof and has been labeled "Prior Art." These side connectors are frequently difficult to connect and disconnect from a plug 5 during installation and repair. In addition, if protection devices were necessary, this required additional labor costs for installing the same to the 66-M type terminal block. These protection devices were generally specially-designed separate assemblies which had to be connected to the terminal block, that is, plug-in type assemblies.

The present invention represents improvements over the conventional 66-M type terminal block used in telephone equipment and other communication applications. In the present invention, the housing has been designed to fit into the same footprint as that of the conventional 66-M type terminal block. The pre-assembled printed circuit board is mounted inside the housing and is adapted to receive any number of circuit protector combinations of overvoltage, overcurrent, and line status devices so as to provide the kind of electrical protection desired. Further, a first side of the housing is adapted to receive the exposed side connector device, and a second side of the housing is adapted to receive the protected side connector device. Each of the exposed side and protected side connector devices can be one of several different types of connectors so as to provide versatile mechanical connections to the circuit protectors.

OBJECTS OF THE INVENTION

Accordingly, it is a general object of the present invention to provide a novel and improved circuit protection assembly which is relatively simple and economical to manufacture and assemble.

It is an object of the present invention to provide a circuit protection assembly having a two-piece interfitting housing for receiving a printed circuit board for mounting overvoltage, overcurrent and/or line status devices, an exposed side connector device, and a protected side connector device.

It is another object of the present invention to provide a circuit protection assembly which is characterized by a design which greatly facilitates assembly and installation thereof.

It is still another object of the present invention to provide a circuit protection assembly which is particularly useful for purposes of fitting into the footprint of a 66-M type terminal block for accommodating a plurality of circuit protector devices and a variety of different input and output connector devices.

SUMMARY OF THE INVENTION

In a preferred embodiment of the present invention, there is provided a circuit protection assembly for protecting telephone communication related equipment and the like which includes a housing formed of co-mating base and cover members. The base and cover members have outer confronting side wall members. The side wall members of the base member are recessed so as to form a cavity for receiving and enclosing a printed circuit board sub-assembly. The printed circuit board sub-assembly is disposed within the housing for mounting a plurality of circuit protectors. A first connector-receiving section is formed on one of the side wall members of the base member and is adapted to receive an input side connector device. A second connector-receiving section is formed on the other side wall members of the base members and is adapted to receive an output side connector device.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout the various views, and wherein.

DESCRIPTION OF THE PREFERRED EMBODIMENTS

Referring now in detail to the various views of the drawings and in particular to FIGS. 1 through 7, there is shown a first embodiment of a 25-pair circuit protection assembly of the present invention which is designated generally by reference numeral 10 and suitably fits into the footprint of a 66-M type terminal connector block 2 (as shown in FIG. 1A) in common use in telephone communication related equipment and other electronic applications. The 25-pair circuit protection assembly 10 is utilized to protect sensitive communication equipment comprising up to 25-pairs of wires (50 lines) from transient voltage surges and overcurrent conditions on voice and data lines as well as providing visual indication of the line status for each pair of wires. The protection assembly 10 may be used as a network interface in a multitude of customer applications because it can accommodate a number of different input/output connector devices. In addition, the protection assembly can provide a variety of circuit protector options so as to protect against the different types of threats that is, overvoltage, overcurrent, and the like).

Figure 2:
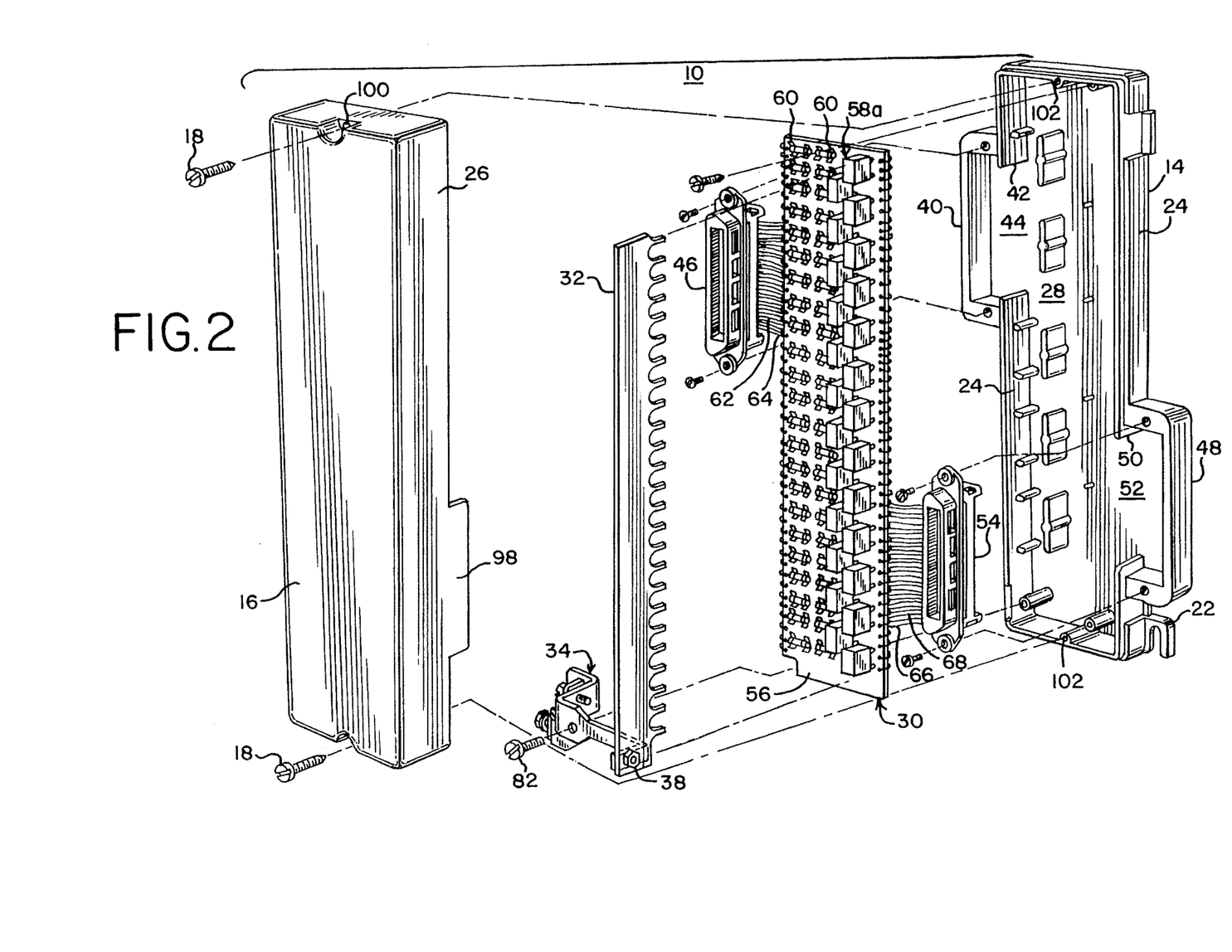
FIG. 2 is an exploded perspective view of the 25-pair circuit protection assembly of FIG. 1.

The circuit protection assembly 10 includes a molded housing 12 made of a suitable plastic material, such as polycarbonate and the like which is comprised of a base member 14 and a co-mating cover member 16. The cover member 16 can be secured to and interlocks with the base member 14 by a pair of captive screws 18. When the cover member 16 is removed from the base member 14, the captive screws are designed so as to be retained in the cover member 16. The housing has a generally rectangular configuration and is adapted to be mounted into the footprint of the 66-M terminal block by means of upper and lower mounting projections 20 and 22.

The base and cover members 14 and 16 are provided with outer confronting side wall members 24 and 26, respectively. The two side wall members 24 of the base member 14 are recessed so as to form a cavity 28 for receiving and enclosing a printed circuit board subassembly 30. An elongated ground bar 32 is provided for reasons that will become apparent which interfits with the printed circuit board subassembly 30. A ground bar extension 34 has one end connected to the ground bar 32 by means of a screw 36 and a nut 38. The other end of the ground bar extension 34 extends from the side of the housing which can be used for bolting directly to a grounded frame system (not shown) set up for the 66-M terminal block or for connection to an external common ground bus (also not shown) by means of a wire.

The base member 14 includes an upper connector-receiving section 40 which is formed integrally to the side wall member 24 at opening 42. The connector-receiving section 40 is formed of a rectangular shape having a cavity 44 and is adapted to receive an input or exposed side connector device 46. As illustrated in this particular embodiment, the connector device 46 is preferably a 25-pair insulation displacement connector receptacle, such as is commercially available from AMP Incorporated of Harrisburg, Pennsylvania, under their Part No. 2-552001-1, style RP. The base member also includes a lower connector-receiving section 48 which is formed integrally with the side wall member 24 at opening 50. The connector-receiving opening 48 is formed as a rectangular shape having a cavity 52 and is adapted to receive an output or protected side connector device 54. The output side connector device 54, as illustrated, is also preferably a 25-pair insulation displacement connector receptacle, which is the same as the input side connector device 46. It will be noted that the connector devices 46 and 54 are held in the respective cavities 44 and 52 so as to face the user rather than to the sides, as in the prior art of FIG. 1A, thereby facilitating easy installation.

Figure 7:
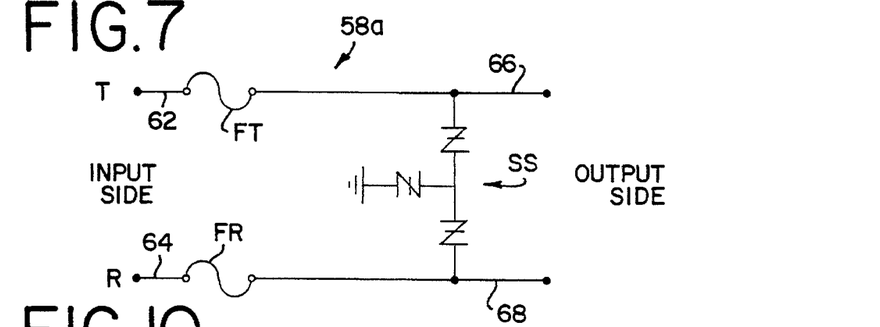
FIG. 7 is a schematic circuit diagram of the protection device for use with one of the 25-pairs of wires in the first embodiment of FIG. 1.

The printed circuit board sub-assembly 30 includes a printed circuit board 56 and a plurality (25) of circuit protectors 58a. Each of the 25 circuit protectors 58a is formed of a pair of sneak current fuses FT and FR and a solid-state voltage suppressor SS. A schematic circuit diagram of one of the circuit protectors 58a for use with one of the 25-pairs of wires is illustrated in FIG. 7 of the drawings.

There is provided 100 fuse contact holders 60 which are arranged in 25 rows with each row having four fuse holders. Two fuse holders are required for the fuse FT in each row, and two fuse holders are required for the fuse FR in each row. Each pair of the 25-pairs of wires of the input side connector device 46 is connected to one end of the respective fuses FT and FR by means of wires 62 and 64. For the sake of clarity, only a few of these wires have been illustrated in FIG. 2. Each pair of the 25-pairs of wires of the output side connector device 54 are also connected to the other end of the respective fuses FT and FR by means of wires 66 and 68. Again, only a few of these wires have been shown in FIG. 2.

Figure 11:
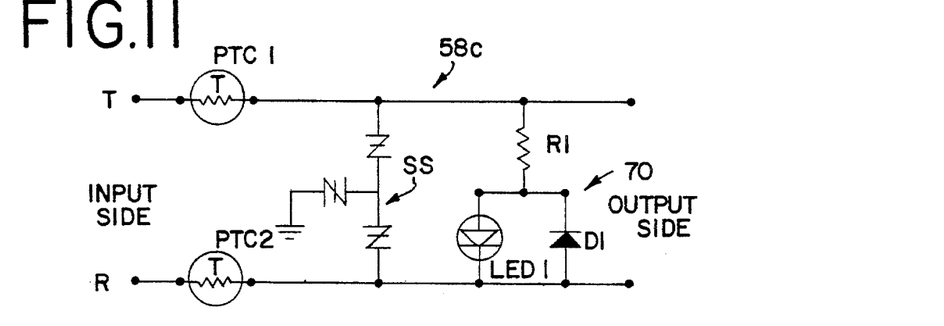
FIG. 11 is an alternate schematic circuit diagram of the protector device for use with one of the 25-pairs of wires.

The sneak current fuses FT and FR, which are removable and replaceable, are used to provide overcurrent protection. These fuses may be alternately replaced by positive temperature coefficient (PTC) devices PTC1 and PTC2 so as to provide resettable current limiting elements. This is illustrated in the diagram of the optional circuit protector 58c of FIG. 11. Further, a light-emitting diode circuit 70 formed of a resistor R1, a reverse diode D1 and a light-emitting diode LED1 may be optionally added so as to provide an indicator device which visually indicates the line status and/or blown fuse of the particular wire pair.

The solid-state voltage suppressors SS are used to provide overvoltage protection and are preferably comprised of a Sidactor. It should be understood that the circuit protector 58a may be modified so as to eliminate the Sidactor SS in order to provide only overcurrent protection. Also, the circuit protector 58a may be modified so as to eliminate the fuses FT and FR in order to provide only overvoltage protection.

Figure 3:
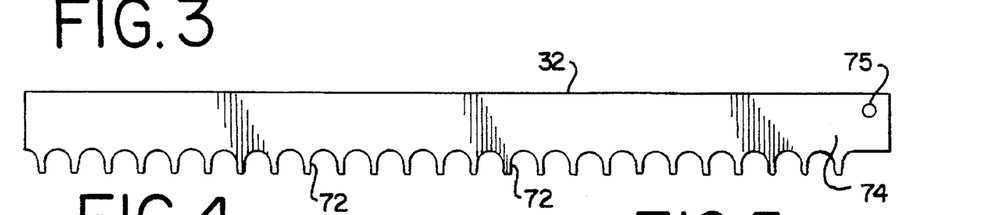
FIG. 3 is a side view of the ground bar.

When the circuit protector includes components which provide overvoltage protection, the ground bar 32 and the ground bar extension 34 are required so as to interconnect the printed circuit board 56 to the external common ground bus. As can be seen in FIG. 3, the elongated ground bar 32 is substantially rectangular in shape and has a relatively narrow width. The ground bar 32 is preferably formed of a copper material. On the lower side of the ground bar, there are provided a plurality of comb-like projections 72 which are used for mounting to the printed circuit board 56. At one end, there is integrally formed a small expanded portion 74 having an aperture 75 therein.

Figure 4:
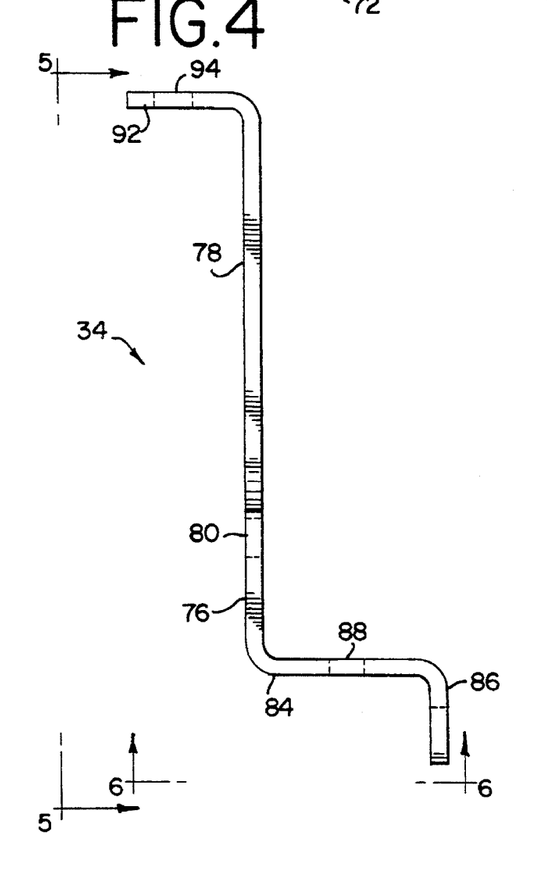
FIG. 4 is a side view of the ground bar extension.
Figure 5:
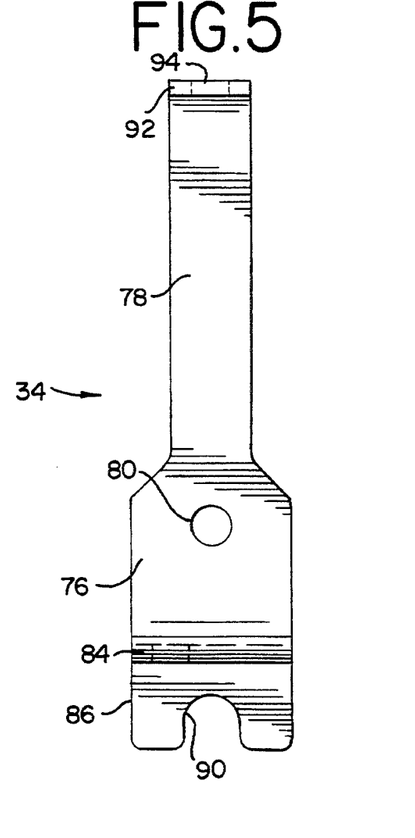
FIG. 5 is a top view of the ground bar extension of FIG. 4, taken along the lines 5—5 of FIG. 4.
Figure 6:
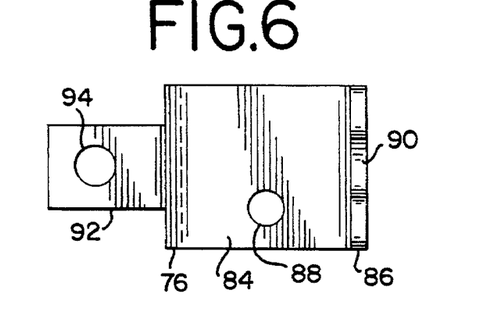
FIG. 6 is an end view of the ground bar extension of FIG. 4, taken along the lines 6—6 of FIG. 4.

The ground bar extension 34 shown in FIG. 2 is illustrated in full detail in FIGS. 4–6. The ground bar extension 34 includes an enlarged horizontal head portion 76 and a relatively narrow body portion 78 formed integrally therewith. The head portion 76 has an opening 80 which receives a screw 82 for mounting it to the housing. At the left end of the head portion 76, there is provided an offset 84 which extends downwardly therefrom at a right angle. At the lower end of the offset 84, there is integrally connected thereto a horizontal flange 86 which extends outwardly therefrom. The offset 84 is formed with a hole 88, and the flange 86 is formed with a U-shaped cut-out portion 90. The hole 88 and the cut-out portion 90 are used to facilitate connection to the external common ground bus. At the right end of the narrow body portion 78, an upwardly extending flange 92 is integrally joined thereto, which has a central aperture 94. The ground bar extension 34 is also preferably formed of a copper material. The screw 36 is extended through the aperture 94 in the flange 92 and through the aperture 75 in the ground bar 32. A nut 38 is threaded onto the screw 36 for securing the ground bar 32 and the ground bar extension 34 together.

The cover member 16 includes an upper rectangular shaped panel 96 extending downwardly from one side wall member 26 and a lower rectangular shaped panel 98 extending downwardly from the other side wall member 26. The panels 96 and 98 are used to close off a portion of the respective openings 42 and 50 formed in the side wall members 24 of the base member 14, thereby separating the cavities 28 from the cavity 44 and 52. The screws 18 are insertable into openings 100 formed in the top and bottom ends of the cover member 16 for threaded engagement into aligned holes 102 disposed in the base member 14 so as to sandwich the printed circuit board sub-assembly 30 therebetween.

In assembly, the fuse contact holders 60, Sidactors SS and the ground bar 32 are mounted on the printed circuit board 56 and are then soldered to the printed circuit board 56 so as to form the printed circuit board sub-assembly 30. The wires 62–68 from the input and output connector devices 46 and 54 are soldered to the underneath side of the printed circuit board 56. The fuses FT and FR are snapped into the respective fuse holders 60. The printed circuit board sub-assembly 30 and the connector devices 46, 54 are mounted by screws to the base member 14 of the housing 12. Next, the ground bar extension 34 is screwed to the ground bar 32 and to the base member 14. Finally, the cover member 16 is placed over the base member 14 and the members 14 and 16 are screwed together. As a result, the 25-pair circuit protection assembly 10 of FIG. 1 is formed.

Figure 8:
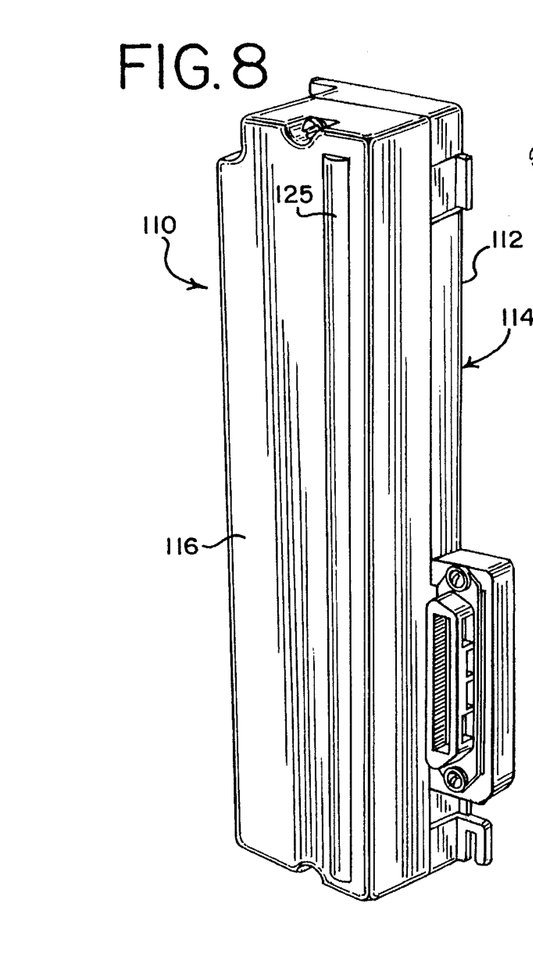
FIG. 8 is a perspective view of a second embodiment of a 25-pair circuit protection device of the present invention.
Figure 9:
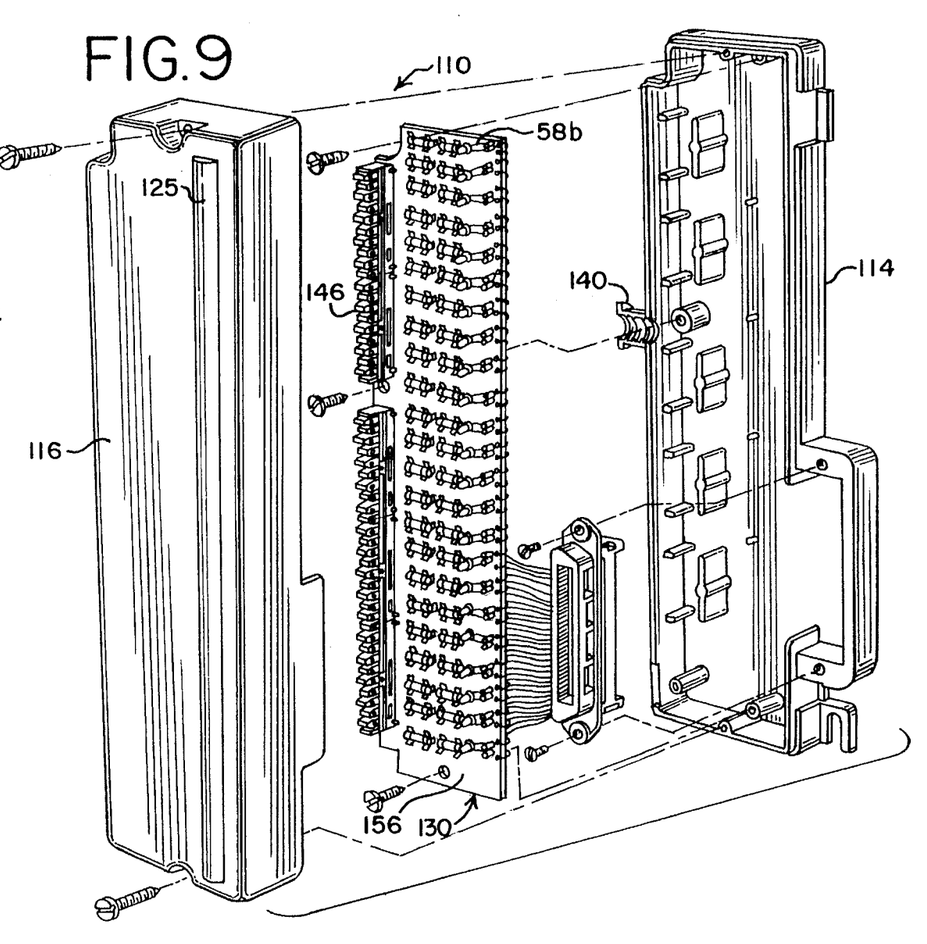
FIG. 9 is a exploded perspective view of the 25-pair circuit protection assembly of FIG. 8.
Figure 10:
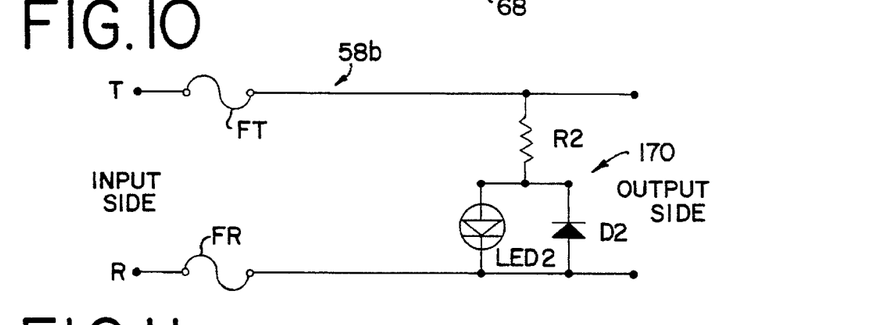
FIG. 10 is a schematic circuit diagram of the protector device for use with one of the 25-pairs of wires in the second embodiment of FIG. 8.

Referring now to FIGS. 8 through 10, there is shown a second embodiment of a 25-pair circuit protection assembly of the present invention which is designated generally by reference numeral 110. It will be noted that the second embodiment is quite similar to the first embodiment of FIG. 1 except that the input side insulation displacement connector receptacle 46 has been replaced by a 110D connecting block 146 which is similar to that commercially available from AT&T. It should be understood that the output side insulation displacement connector receptacle could have been the one replaced with a 110D connecting block 146 or that both the input and output insulation displacement connector receptacles could have been replaced by two 110D connecting blocks. The 110D connecting blocks have pins on their bottom sides so as to be solder mounted on a printed circuit board and have insulation displacement terminals to accept a discrete wire to be punched down into it.

Figure 12:
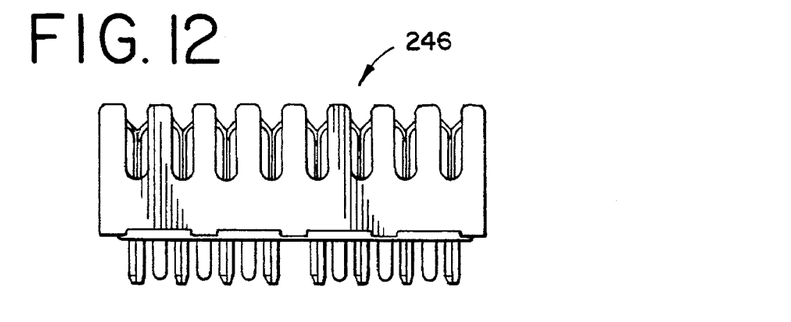
FIG. 12 is a side elevational view of a printed circuit board termination module for use as the input or output side connector in FIG. 1 or FIG. 8.

The sides of the base and cover members 114 and 116 are provided with a short tubular extension 140 which serves as a conduit for bringing in a 25-pair cable, that is supplied by the user, which is terminated at the 110D connecting block 146 on the printed circuit board 156. Further, either or both of the insulation displacement connector receptacles of FIG. 1 could be alternately replaced by a printed circuit board termination module 246 similar to that commercially available from Krone. A side elevational view of the printed circuit board termination module 246 is illustrated in FIG. 12. The termination modules are similar to the 110D connecting blocks and have contacts which serve for mounting to a printed circuit board.

In addition, the printed circuit board sub-assembly 130 includes a printed circuit board 156 and a plurality (25) of circuit protectors 58*b*. Each of the 25 circuit protectors 58*b* is formed of a pair of fuses FT and FR and a light-emitting diode circuit 170. A schematic circuit diagram of one of the circuit protectors 58*b* is illustrated in FIG. 10. The light-emitting diode circuit 170 includes a resistor R2, a reverse diode D2, and a light-emitting diode LED2. In order to view the light-emitting diodes when the cover 116 is secured to the top of the base member 114, there is provided an optional convex highly polished window 125 which extends substantially along the entire length of the cover member 116. When the cover member 116 is secured to the base member 114, the light-emitting diodes can be observed visually to provide line status and/or blown fuse information for each of the 25-pairs of wires.

Figure 13:
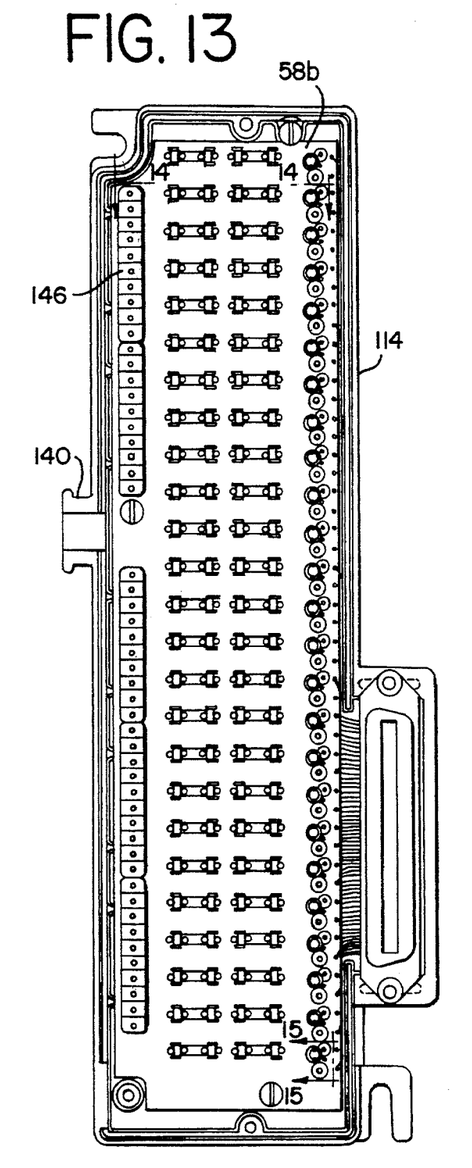
FIG. 13 is a top plan view of the second embodiment assembly of FIG. 8, with the cover member removed.
Figure 14:
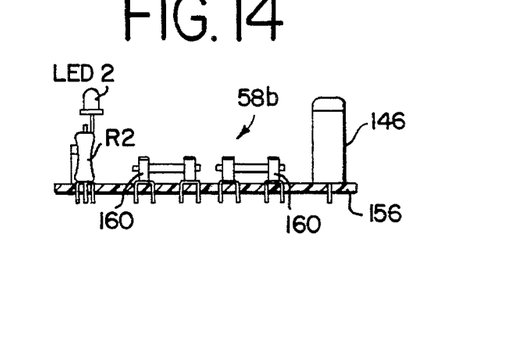
FIG. 14 is a cross-sectional view of the assembly of FIG. 13, taken along the lines 14—14 of FIG. 13.
Figure 15:
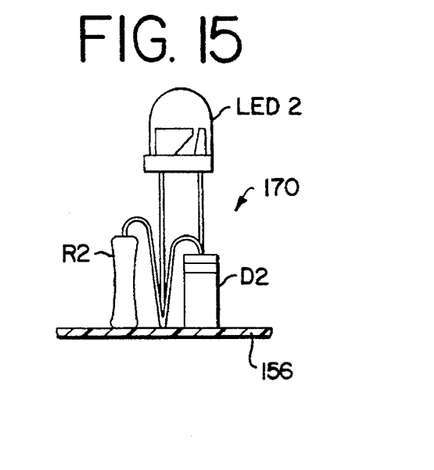
FIG. 15 is a cross-sectional view of the assembly of FIG. 13, taken along the lines 15—15 of FIG. 13.
Figure 16:
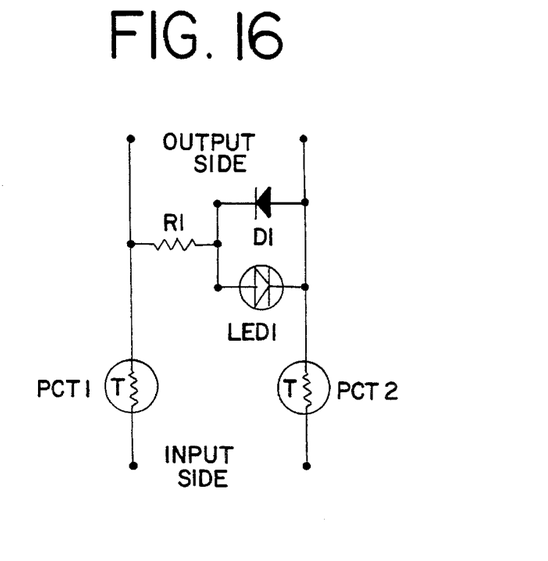
FIG. 16 is another alternate schematic circuit diagram of the protector device for use with one of the 25-pairs of wires.

In FIG. 13, there is shown a top plan view of the second embodiment of FIG. 8 in its substantially fully assembled condition, except for the cover member. FIG. 14 illustrates one of the protector devices 58*b* mounted on the printed circuit board 156. FIG. 15 illustrates the light-emitting diode circuit 170 mounted on the printed circuit board 156. FIG. 16 is a schematic circuit diagram of another alternate protector device 58*d* for use with one of the 25-pairs of wires, which is quite similar to FIG. 11 with the Sidactor eliminated.

From the foregoing detailed description, it can thus be seen that the present invention provides a circuit protection assembly for protecting telephone communication related equipment and the like which includes a two-piece interfitting housing for receiving a printed circuit board, an exposed side connector device, and a protected side connector device. The housing is designed to fit into the same footprint as that of the conventional 66M type terminal block. The printed circuit board is mounted inside the housing and is adapted to receive any number of circuit protector combinations of overvoltage, overcurrent and line status devices. Further, each of the exposed side and protected side connector devices can be one of several different types of connectors so as to provide versatility.

While there has been illustrated and described what is at present considered to be preferred embodiments of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiments disclosed as the best modes contemplated for carrying out the invention, but that the invention will include all embodiments falling within the scope of the appended claims.

What is claimed is:

1. A circuit protection assembly for protecting telephone communication related equipment and the like, comprising:
   a housing formed of a base member and a co-mating cover member, said base member having a rear wall, said cover member having a front wall, and said base and cover members having confronting side wall members which cooperate with said rear wall and said front wall of said base and cover members so as to form a first cavity therebetween;
   a printed-circuit board sub-assembly, having a plurality of circuit protectors disposed thereon, disposed within said first cavity of said housing;
   a first connector-receiving support section comprising additional side wall menders and a portion of said rear wall of said base member extending laterally outwardly in an integral manner from an exterior wall surface of a first one of said side wall members of said base member so as to define a second cavity for mounting and receiving one half of a male/female input-side electrical connector device; and
   a second connector-receiving support section comprising additional side wall members and a portion of said rear wall of said base member extending laterally outwardly in an integral manner from an exterior wall surface of a second one of said side wall members of said base member so as to define a third cavity for mounting and receiving one half of a male/female output-side electrical connector device.

2. A circuit protection assembly as claimed in claim 1, wherein said input side connector device is comprised of a 25-pair insulation displacement connector.

3. A circuit protection assembly as claimed in claim 2, wherein said output side connector device is comprised of a 25-pair insulation displacement connector.

4. A circuit protection assembly as claimed in claim 3, wherein each of said plurality of circuit protectors is comprised of at least one of overcurrent protection means, overvoltage protection means, and line-status indicating means.

5. A circuit protection assembly as claimed in claim 4, further comprising ground bar means including an elongated ground bar extending inside and along the length of said housing for connection to said plurality of circuit protectors when said overvoltage protection means is provided, and a ground bar extension being connected to said elongated ground bar and extending externally of said housing.

6. A circuit protection assembly as claimed in claim 4, wherein said overcurrent protection means includes sneak current fuses.

7. A circuit protection assembly as claimed in claim 4, wherein said overvoltage protection means includes solid-state voltage suppressors.

8. A circuit protection assembly as claimed in claim 4, wherein said line-status indicating means includes a light-emitting diode circuit.

9. A circuit protection assembly as claimed in claim 4, wherein said overcurrent protection means includes PTC devices.

10. A circuit protection assembly as claimed in claim 4, wherein said cover member includes a window for viewing said line-status indicating means.

11. The assembly as set forth in claim 1, wherein:
    said first and second support sections are disposed upon said side wall members of said base member so as to orient said input-side and output-side electrical connector devices such that said input-side and output-side electrical connector devices face said cover member.

12. A circuit protection assembly for protecting telephone communication related equipment and the like, comprising:
    a housing formed of a base member and a co-mating cover member, said base member having a rear wall, said cover member having a front wall, and said base and cover members having confronting side wall members which cooperate with said rear wall and said front wall of said base and cover members so as to form a first cavity therebetween;
    a printed-circuit board sub-assembly, having a plurality of circuit protectors disposed thereon, disposed within said first cavity of said housing; and
    at least one connector-receiving support section comprising additional side wall members and a portion of said rear wall of said base member extending laterally outwardly in an integral manner from an exterior wall surface of one of said side wall members of said base member so as to define a second cavity for mounting and receiving one half of at least one male/female input/output electrical connector means so as to supply/receive 25-pairs of wires to/from said printed circuit board sub-assembly.

13. A circuit protection assembly as claimed in claim 12, wherein said housing is adapted to fit into the footprint of a conventional 66-M type terminal block.

14. A circuit protection assembly as claimed in claim 12, wherein said input/output connector means comprises an input connector means which is comprised of one of a 25-pair insulation displacement connector, a 110D connecting block, and a printed circuit board termination module.

15. A circuit protection assembly as claimed in claim 12, wherein said input/output connector means comprises an output connector means which is comprised of one of a 25-pair insulation displacement connector, a 110D connecting block, and a printed circuit board termination module.

16. The assembly as set forth in claim 12, wherein:
    said at least one support section is disposed upon said at least one of said side wall members of said base member so as to orient said input/output connector means such that said input/output connector means faces said cover member.

17. A circuit protection assembly as claimed in claim 15, wherein each of said plurality of circuit protectors is comprised of at least one of overcurrent protection means, overvoltage protection means, and line-status indicating means.

18. A circuit protection assembly as claimed in claim 17, wherein said overcurrent protection means includes sneak current fuses.

19. A circuit protection assembly as claimed in claim 17, wherein said overvoltage protection means includes solid-state voltage suppressors.

20. A circuit protection assembly as claimed in claim 17, wherein said line-status indicating means includes a light-emitting diode circuit.

21. A circuit protection assembly as claimed in claim 17, wherein said overcurrent protection means includes PTC devices.

22. A circuit protection assembly for protecting telephone communication related equipment and the like, comprising:
    housing means formed of rear wall, front wall, and confronting side wall members which cooperate together so as to form a first cavity therebetween;
    printed circuit board means disposed within said first cavity of said housing means and having a plurality of circuit protector means disposed thereon; and at least one connector-receiving support section comprising additional side wall members and a portion of said rear wall of said housing means extending laterally outwardly in an integral manner from an exterior wall surface of one of said side wall members of said housing means so as to define a second cavity for mounting and receiving one half of at least one male/female input/output electrical connector means for connection to said printed circuit board means.

23. The assembly as set forth in claim 22, wherein:

said at least one support section is disposed upon said rear wall of said housing means so as to orient said input/output connector means such that said input/output connector means faces said front wall of said housing means.

\* \* \* \* \*